United States Patent
Baxter et al.

(10) Patent No.: US 10,087,750 B2
(45) Date of Patent: *Oct. 2, 2018

(54) RADIO FREQUENCY IDENTIFICATION SYSTEM FOR MINERAL EXTRACTION EQUIPMENT

(71) Applicant: Cameron International Corporation, Houston, TX (US)

(72) Inventors: Daniel B. Baxter, Tomball, TX (US); John D. Scalzo, Baton Rouge, LA (US); Jonatan Ram, Metairie, LA (US); Adam Sitar, Prairieville, LA (US); Ritabrata Das, Baton Rouge, LA (US)

(73) Assignee: Cameron International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,116

(22) Filed: Oct. 9, 2015

(65) Prior Publication Data

US 2016/0032716 A1     Feb. 4, 2016

Related U.S. Application Data

(63) Continuation of application No. 13/410,661, filed on Mar. 2, 2012, now Pat. No. 9,181,793.

(Continued)

(51) Int. Cl.
    *E21B 47/12*        (2012.01)
    *E21B 47/09*        (2012.01)

(Continued)

(52) U.S. Cl.
    CPC ............ *E21B 47/122* (2013.01); *E21B 44/00* (2013.01); *E21B 47/09* (2013.01); *G01V 15/00* (2013.01);

(Continued)

(58) Field of Classification Search
    CPC .......... E21B 44/00; E21B 47/01; E21B 47/09; E21B 47/122; G01S 13/00; G01V 11/002;

(Continued)

(56) References Cited

U.S. PATENT DOCUMENTS 5,081,445 A * 1/1992 Gill ...................... G08B 13/242
                                                                                 340/572.1
7,707,076 B1     4/2010   Whiteley et al.

(Continued)

FOREIGN PATENT DOCUMENTS

JP          2008094588        4/2008
WO        2011017278        2/2011
WO    WO2012/119048 A2 *   9/2012            E21B 47/122

OTHER PUBLICATIONS

Cameron International Corporation, WO2012119048A2, PCT Preliminary Report on Patentability, WIPO, dated Sep. 3, 2013.*

(Continued)

*Primary Examiner* — Quan-Zhen Wang
*Assistant Examiner* — Stephen Burgdorf
(74) *Attorney, Agent, or Firm* — Chamberlain Hrdlicka

(57) ABSTRACT

A system including, a first component of a mineral extraction system, and a first radio frequency identification (RFID) module coupled to the first component, wherein the first RFID module comprises first component data relating to the first component, and first location data relating to a first location of the first component.

9 Claims, 9 Drawing Sheets

Related U.S. Application Data

(60) Provisional application No. 61/448,641, filed on Mar. 2, 2011.

(51) Int. Cl.
    *G01V 15/00*         (2006.01)
    *H04B 5/00*          (2006.01)
    *G06Q 50/02*         (2012.01)
    *G06Q 10/08*         (2012.01)
    *E21B 44/00*         (2006.01)
    *G01V 11/00*         (2006.01)

(52) U.S. Cl.
    CPC ......... *G06Q 10/0833* (2013.01); *G06Q 50/02* (2013.01); *H04B 5/0062* (2013.01); *G01V 11/002* (2013.01)

(58) Field of Classification Search
    CPC .......... G01V 15/00; G06K 7/01; G06Q 10/08; G06Q 10/0833; G06Q 10/087; G06Q 10/10; G06C 50/02; H04B 5/0062
    USPC ............... 166/64; 175/40; 235/175; 340/5.8, 340/10.1, 10.41, 539.13, 539.32, 572.1, 340/854.1, 854.2, 854.6; 709/217
    See application file for complete search history.

(56) References Cited

U.S. PATENT DOCUMENTS

| | | |
|---|---|---|
| 8,315,789 B2 | 11/2012 | Dunbabin et al. |
| 8,710,714 B2 | 4/2014 | Loi et al. |
| 9,181,793 B2 | 11/2015 | Baxter et al. |
| 2005/0237163 A1* | 10/2005 | Lee .................. G06K 19/0723 340/10.51 |
| 2006/0001543 A1 | 1/2006 | Raskar et al. |
| 2006/0290519 A1 | 12/2006 | Boate et al. |
| 2007/0164863 A1 | 7/2007 | Himberger et al. |
| 2007/0236338 A1 | 10/2007 | Maruyama |
| 2008/0252449 A1* | 10/2008 | Colvero ................. G01S 13/74 340/540 |
| 2009/0055293 A1 | 2/2009 | Mueller |
| 2009/0085745 A1 | 4/2009 | Gupta et al. |
| 2009/0097846 A1 | 4/2009 | Kozischek et al. |
| 2009/0115609 A1 | 5/2009 | Weaver |
| 2009/0121895 A1 | 5/2009 | Denny et al. |
| 2009/0315678 A1 | 12/2009 | Padmanabhan et al. |
| 2009/0327102 A1 | 12/2009 | Maniar et al. |
| 2010/0097221 A1 | 4/2010 | Kreiner et al. |
| 2010/0201520 A1* | 8/2010 | Stern .................... G01S 13/878 340/572.1 |
| 2010/0231407 A1 | 9/2010 | Carr |
| 2010/0245075 A1 | 9/2010 | Stevens et al. |
| 2010/0326665 A1 | 12/2010 | Redlinger et al. |
| 2011/0043373 A1 | 2/2011 | Best et al. |
| 2011/0309931 A1 | 12/2011 | Rose |
| 2012/0068813 A1 | 3/2012 | Karttaavi et al. |
| 2012/0075072 A1 | 3/2012 | Pappu |
| 2012/0092130 A1 | 4/2012 | Chung et al. |
| 2012/0092134 A1 | 4/2012 | Stern et al. |
| 2012/0237083 A1 | 9/2012 | Lange et al. |

OTHER PUBLICATIONS

Cameron International Corporation, WO2012119048A2, PCT International Search Reort, WIPO, dated Sep. 14, 2012.*
International Search Report and Written Opinion of PCT Application No. PCT/US2012/027427 dated Sep. 14, 2012: pp. 1-9.

* cited by examiner

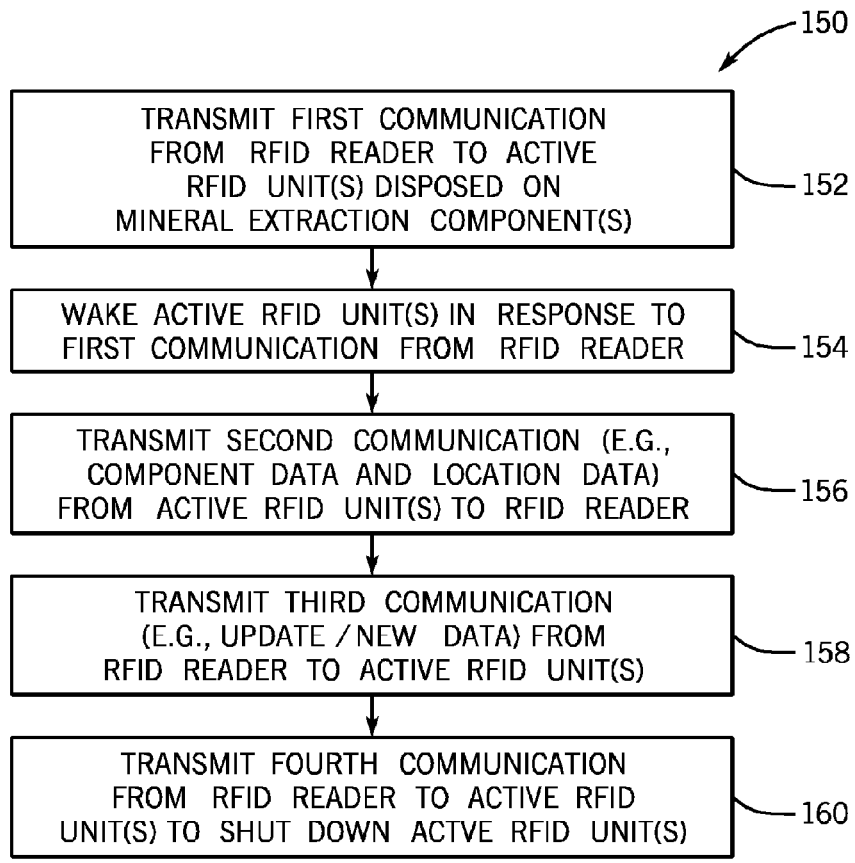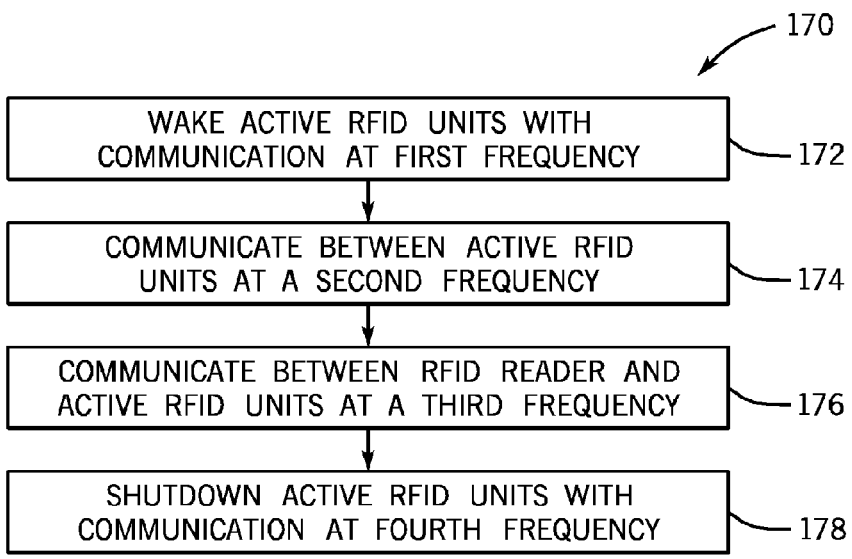

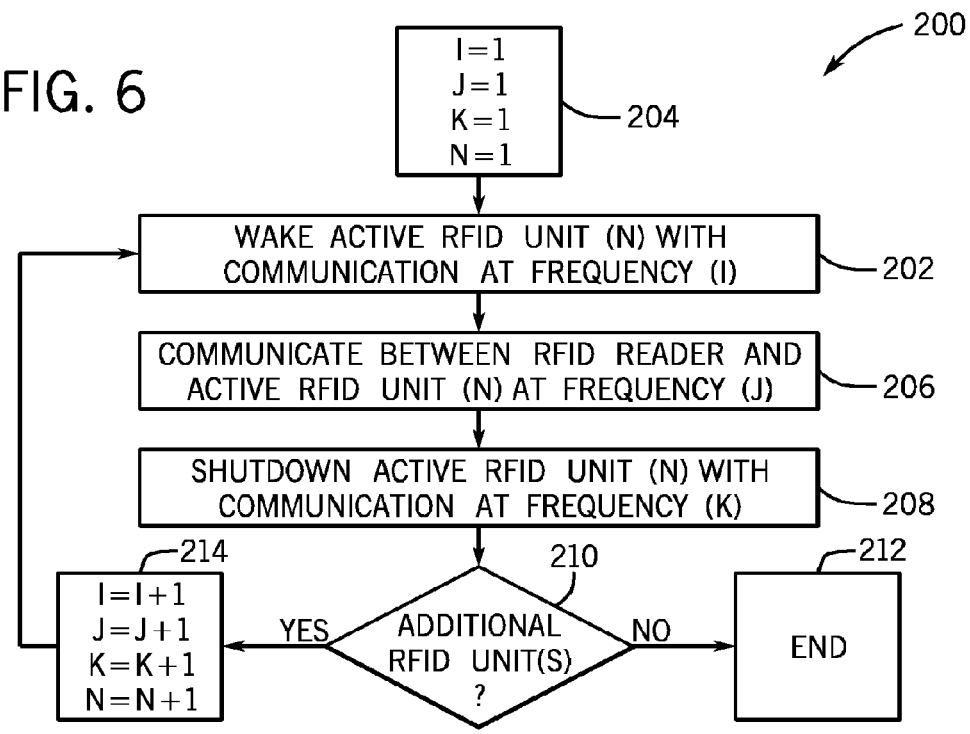
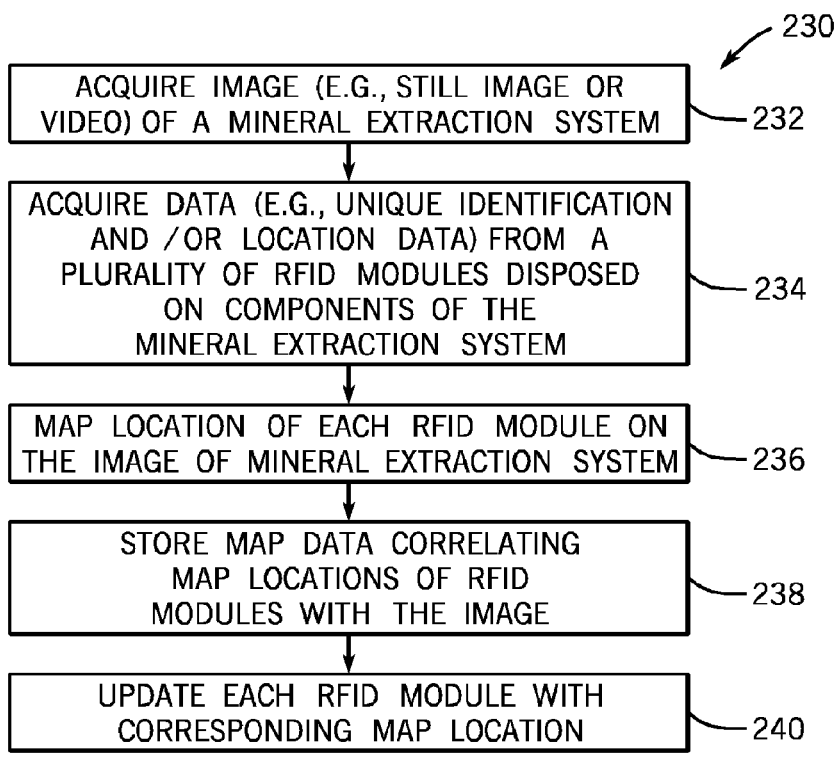

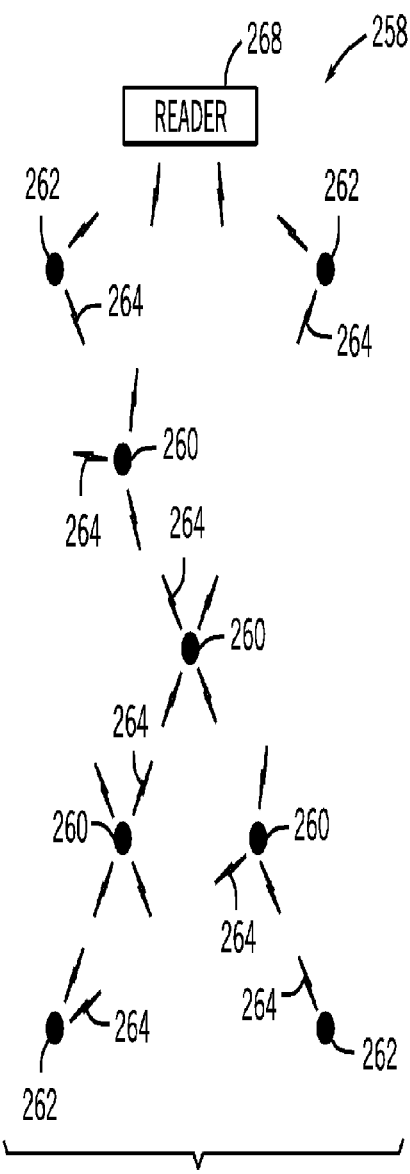
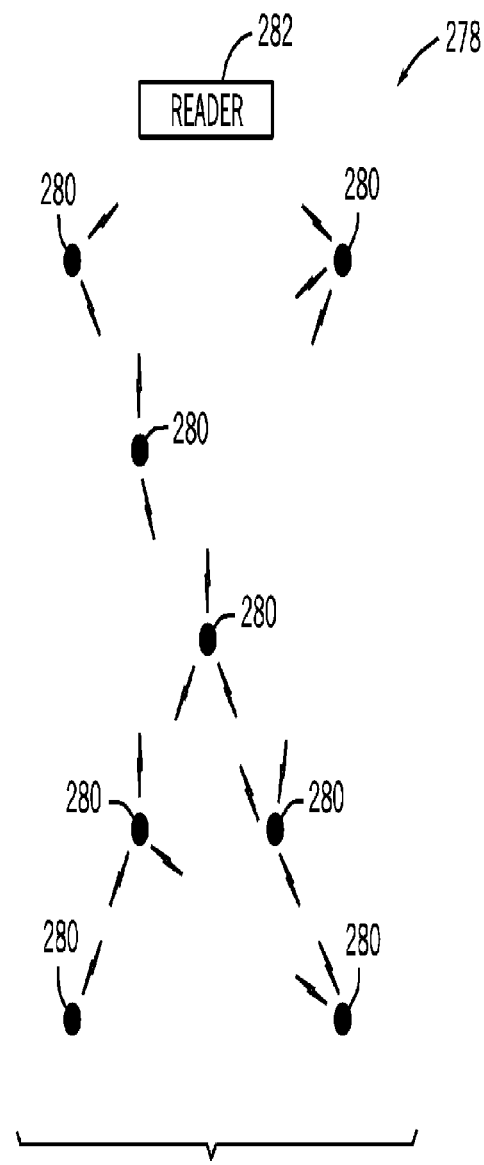
FIG. 8
FIG. 9

RADIO FREQUENCY IDENTIFICATION SYSTEM FOR MINERAL EXTRACTION EQUIPMENT

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In order to meet the demand for resources such as oil, natural gas, and other subterranean resources companies often invest significant amounts of time and money in searching for and extracting them from the earth. Particularly, once a desired resource is discovered below the surface of the earth, drilling and production systems are often employed to access and extract the resource. Such systems generally include a wellhead assembly through which the resource is extracted and a Christmas tree that controls the flow of fluids into and out of the wellhead. When assembled, the tree may couple to the wellhead and include a variety of valves, fittings, and controls for operating the well. Unfortunately, existing systems are not effective in managing the various pieces of equipment and assisting operators in determining their location.

DESCRIPTION OF THE DRAWINGS

Various features, aspects, and advantages of the present invention will become better understood when the following detailed description is read with reference to the accompanying figures in which like characters represent like parts throughout the figures, wherein:

FIG. 4 is a flow chart of an embodiment of a process for communicating with active RFID module(s);

FIG. 5 is a flow chart of an embodiment of a process for communicating with active RFID modules at different frequencies;

FIG. 6 is a flow chart of an embodiment of a process for communicating with each RFID module individually;

FIG. 7 is a flow chart of an embodiment of a process for mapping the location of an RFID module onto an image;

FIG. 8 is a block diagram of an embodiment of RFID modules wherein blind modules are communicating with reference modules to determine their location;

FIG. 9 is a block diagram of an embodiment of RFID modules wherein all the modules are reference modules;

DESCRIPTION OF SPECIFIC EMBODIMENTS

Figure 1:
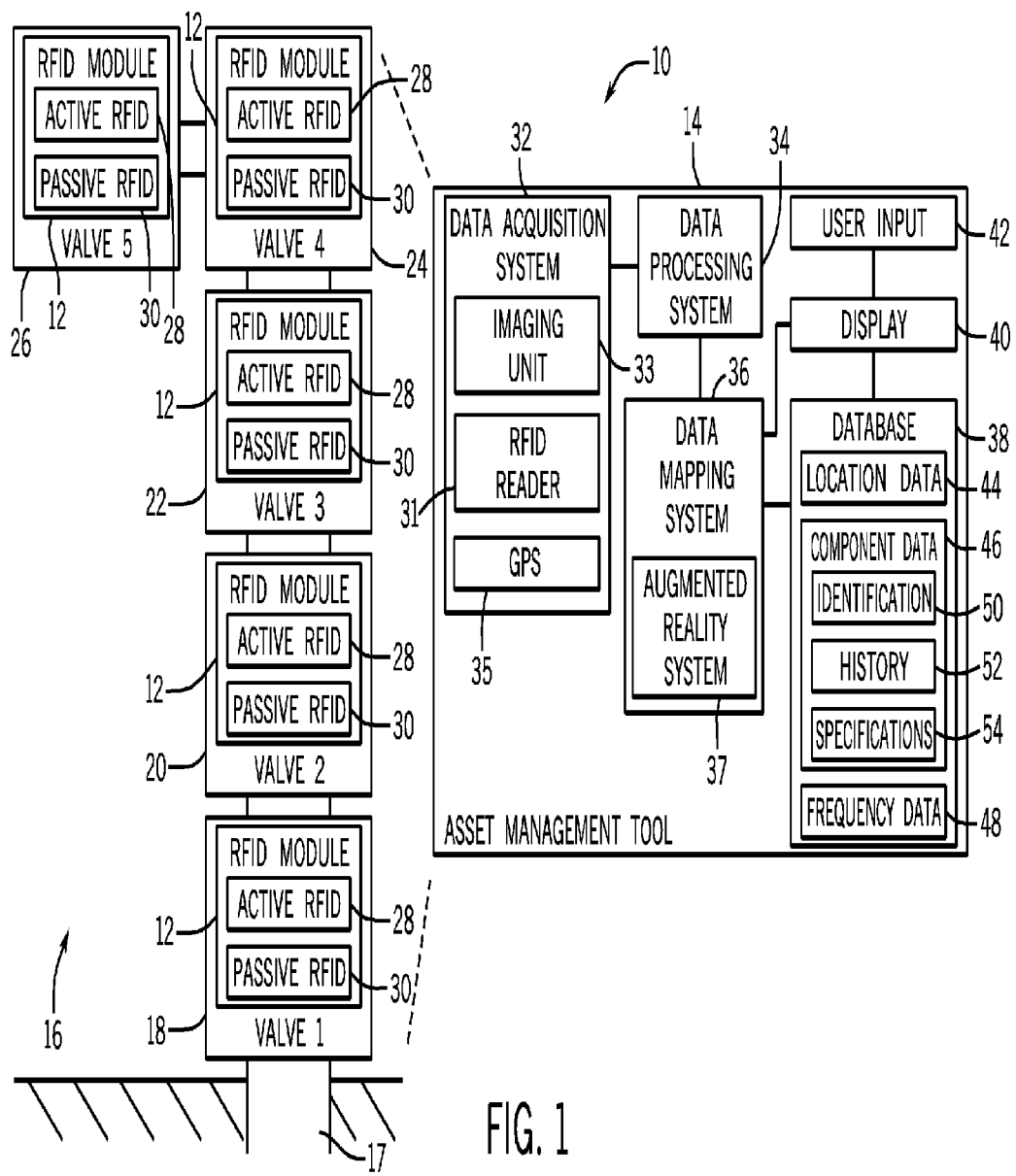
FIG. 1 is a block diagram of an embodiment of an asset management system with radio frequency identification (RFID) modules and an asset management tool.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments disclosed below include a radio frequency identification (RFID) system for asset management of various flow control equipment, mineral extraction equipment, underwater (e.g., subsea) equipment, oil and gas equipment, or any combination thereof. Although the disclosed embodiments may be used with a variety of equipment, including the equipment noted above, the following discussion presents the RFID system in context of mineral extraction equipment. Nevertheless, the disclosed embodiments are intended to be used with other equipment, such as the equipment listed above. The RFID system includes an asset management tool that interacts with various RFID modules, which may include both active and passive RFID modules integrated together in a common package, distributed on various equipment. For example, each component of mineral extraction equipment may include one or more RFID modules. The RFID modules enable the asset management tool to identify and determine information about the equipment through radio wave communications. The RFID modules may also include a memory for storing information received from and for information to be transmitted to the asset management tool.

The RFID modules may include an active RFID module and a passive RFID module. The passive RFID modules may enable close range communications relating to individual RFID modules (and corresponding equipment), while the active RFID modules may enable communications at a greater distance with one or more of the RFID modules at the same time. In other words, the RFID system may simultaneously transmit and/or receive transmissions with a plurality of active RFID modules, thereby managing an entire asset at a distance. The RFID modules may use different radio frequencies for communication with the asset management tool as well as with each other. For example, the RFID modules may communicate location information amongst each other at one frequency and communicate with the asset management tool at another frequency. By further example, the RFID modules and/or the asset management tool may communicate at a first frequency relating to a power control function (e.g., a wakeup function and/or a sleep function), a second frequency for communicating between the RFID modules and the tool, a third frequency for communicating directly between RFID modules, and/or additional frequencies for other functions.

The active RFID modules enable the asset management tool to identify the locations of particular pieces of mineral extraction equipment on an image of a mineral extraction system. For example, a still image may be acquired of the mineral extraction equipment, and each component of the equipment in the image may be correlated to a particular RFID module. This is possible, at least in part, due to the ability of the active RFID modules to communicate information over significant distances. This enables an operator to perform a variety of functions including, but not limited to, acquiring inventory of mineral extraction equipment, identifying equipment needing maintenance, identifying equipment needing visual inspection, receiving data regarding particular pieces of equipment, and various other functions, all while at a standoff distance. In contrast, the passive RFID modules may ensure that an operator visually inspects or performs maintenance on a mineral extraction component, due to the short transmission distances of passive RFID.

Furthermore, the embodiments below describe an RFID system that includes an augmented reality system. The augmented reality system is configured to overlay information onto a real-time image of the mineral extraction system. For example, the augmented reality system may overlay symbols, icons, text, menus, or various operator selectable points or regions onto the real-time image of the real world object (e.g., the mineral extraction system). Thus, an operator can simultaneously view the real-time image of the mineral extraction system, while also obtaining information about the mineral extraction system from the overlaid information. In particular, an operator selectable feature may be overlaid onto each component (corresponding to the RFID tag for that component) of the mineral extraction system in the real-time image, such that the operator can quickly obtain information about each component. In this manner, the augmented reality system enables an operator to continuously view the location of RFID modules as the operator changes position around a mineral extraction system. For example, the augmented reality may include an imaging system, such as a camera, to acquire video or still images as the operator moves around the mineral extraction system. In certain embodiments, the imaging system may be integrated into a portable device, such as a laptop computer, a tablet computer, a smart phone, a personal digital assistant, or another processor-based device having a camera, a display, a processor, and memory.

FIG. 1 is a block diagram of an embodiment of an asset management system 10 with radio frequency identification (RFID) modules 12 and an asset management tool 14. As illustrated, the RFID modules 12 are distributed on a Christmas tree 16 of a mineral extraction system. The Christmas tree 16 attaches to a wellhead 17 in order to extract subsurface minerals. In particular, the Christmas tree 16 includes various flow control components 18, 20, 22, 24, and 26 (e.g., valves, chokes, fittings, and controls) configured to assist in the extraction of the subsurface minerals. The valves, chokes, fittings, and controls may periodically need servicing, replacement, periodic checkups, and any number of other services during the operational life of the well. Furthermore, the valves, chokes, fittings, and controls may need asset management before and/or after deployment at a particular wellhead 17. The asset management system 10 may therefore assist in tracking the location of valves, fittings, and controls on the Christmas tree 16. The Christmas tree may be either a surface tree or a tree located subsea for a subsea well.

As illustrated in FIG. 1, each of the flow control components (e.g., valves) 18-26 includes a respective RFID module 12. In other embodiments, the RFID modules 12 may be attached to other pieces of equipment (e.g., pumps, fittings, controls, and other pieces of equipment). Each of these RFID modules 12 may include both an active RFID unit 28 and a passive RFID unit 30. The active and passive RFID units 28 and 30 may transmit data to the asset management tool 14 for use by the asset management system 10. The data may include items such as location data, power control data, and component data, among others. For example, the data may include historical operational data, historical servicing/maintenance data, model/serial number data, and so forth. By further example, the location data may include absolute locations of the RFID modules 12 relative to a reference point, relative locations among the RFID modules 12, geographical locations of the RFID modules 12, or any combination thereof.

The asset management tool 14 may include a data acquisition system 32, a data processing system 34, a data mapping system 36, a database 38, a display 40, and a user input 42. The data acquisition unit 32 may further include an RFID reader 31, an imaging unit 33, and a global positioning system (GPS) 35. The RFID reader 31 receives and transmits radio frequency signals to/from the RFID modules 12, thus enabling communication with the RFID modules 12. The imaging unit 33 images the equipment having the RFID modules 12 with still images and/or video images. For example, the imaging unit 33 may be a still camera or video camera that takes pictures of the Christmas tree 16 with the RFID modules 12. The GPS 35 is configured to obtain a geographical location of the asset management tool 14, such that the geographical location may be used in combination with relative locations of the RFID modules 12 within the Christmas tree 16. In some embodiments, as discussed in detail below, each RFID module 12 also may include a GPS, such that the geographical location may be obtained for each individual module 12. In some embodiments, the RFID reader 31, imaging unit 33, and GPS 35 may be combined into a single device or may be physically separate pieces of equipment.

As the RFID reader 31, imaging unit 33, and GPS 35 receive information, the information is passed onto the data processing system 34. The data processing system 34 may include processors and other electronic components that process the images taken by the imaging unit 33 and data received by the RFID reader 31. The processed information is then sent to the data mapping system 36. For example, the processed information may include relative physical locations among the RFID modules 12, absolute positions of the RFID modules 12 relative to a reference point (e.g., the tool 14), geographical positions of the RFID modules 12 (e.g., GPS positions), or any combination thereof.

The data mapping system 36 receives the processed image and RFID module 12 data and then advantageously maps the location of the RFID modules 12 onto still image(s) or video. In other words, the relative physical locations of the RFID modules 12 are used to identify locations of the RFID modules 12 on the image. In addition to mapping the location of the RFID modules onto images, the data mapping system 36 associates information in the database 38 with specific RFID modules 12.

In the illustrated embodiment, the data mapping system 36 include an augmented reality system 37 configured to overlay various information onto a real-time image (e.g., video) of the Christmas tree 16. For example, as discussed in further detail below, the asset management tool 14 may output a real-time image (e.g., video) of the Christmas tree 16 via the display 40, and include icons, text, or other indicia representing each RFID module 12 (and thus each component) directly on the real-time image. In this way, an operator may view the real-time image of the Christmas tree 16, and immediately obtain information about each RFID module 12. For example, an operator may interact with the user input 42 (e.g., a touch screen) to select an icon representing a particular RFID module 12, thereby activating a pop-up window (or other graphical interface) to access details stored in the RFID module 12 and/or the database 38.

The database 38 may store a variety of information either transmitted from the RFID modules 12 or previously entered. For example, the database 38 may include location data 44, component data 46, and frequency data 48. The location data 44 may include relative physical locations among the RFID modules 12, absolute locations of the RFID modules 12 relative to a reference point (e.g., tool 14, reference node, etc.), geographical locations (e.g., GPS locations) of the RFID modules 12 and/or the tool 14, or any combination thereof. Furthermore, the location data 44 may be any type of location information useful in mapping the RFID modules 12 to the image. Subcategories of the component data 46 may include identification data 50, history 52, and specifications 54. In particular, the identification data 50 may include unique identifiers, such as model and serial numbers. The history data 52 may include historical information, such as maintenance history, performance history, installation dates, and previously broken components, among others. The specifications data 54 may include specifications for possibly different types of RFID modules 12, the active RFID units 28, the passives RFID unit 30, flow control components 18-26, or other kinds of components that the RFID modules 12 mark for the asset management tool 14.

As illustrated in FIG. 1, the data mapping system 36 sends information to the display 40. The display 40 accordingly may display the position of the RFID modules 12 on an image captured by the imaging unit 33, and display information stored on the RFID modules 12 in a table, chart, or other presentation correlated to the image. This enables an operator to quickly identify an asset's position (i.e., a valve, fitting, etc.) as well as view important information about the asset (e.g., history 52, specifications 54). Finally, the user input 42 enables an operator to update, change, and retrieve information in the database 38. While FIG. 1 illustrates that the asset management tool 14 may advantageously include all of the systems 32-36, database 38, display 40, and user input 42 within a single physical tool, in other embodiments the tool 14 may be separated into two or more separate tools. For example, in the case of a subsea well, the data acquisition system 32 may be located on an underwater remotely operated vehicle (ROV) that communicates information to a data processing system 34 located at the sea surface either through a hard wire communication connection or other type of wired or wireless telemetry system.

Figure 2:
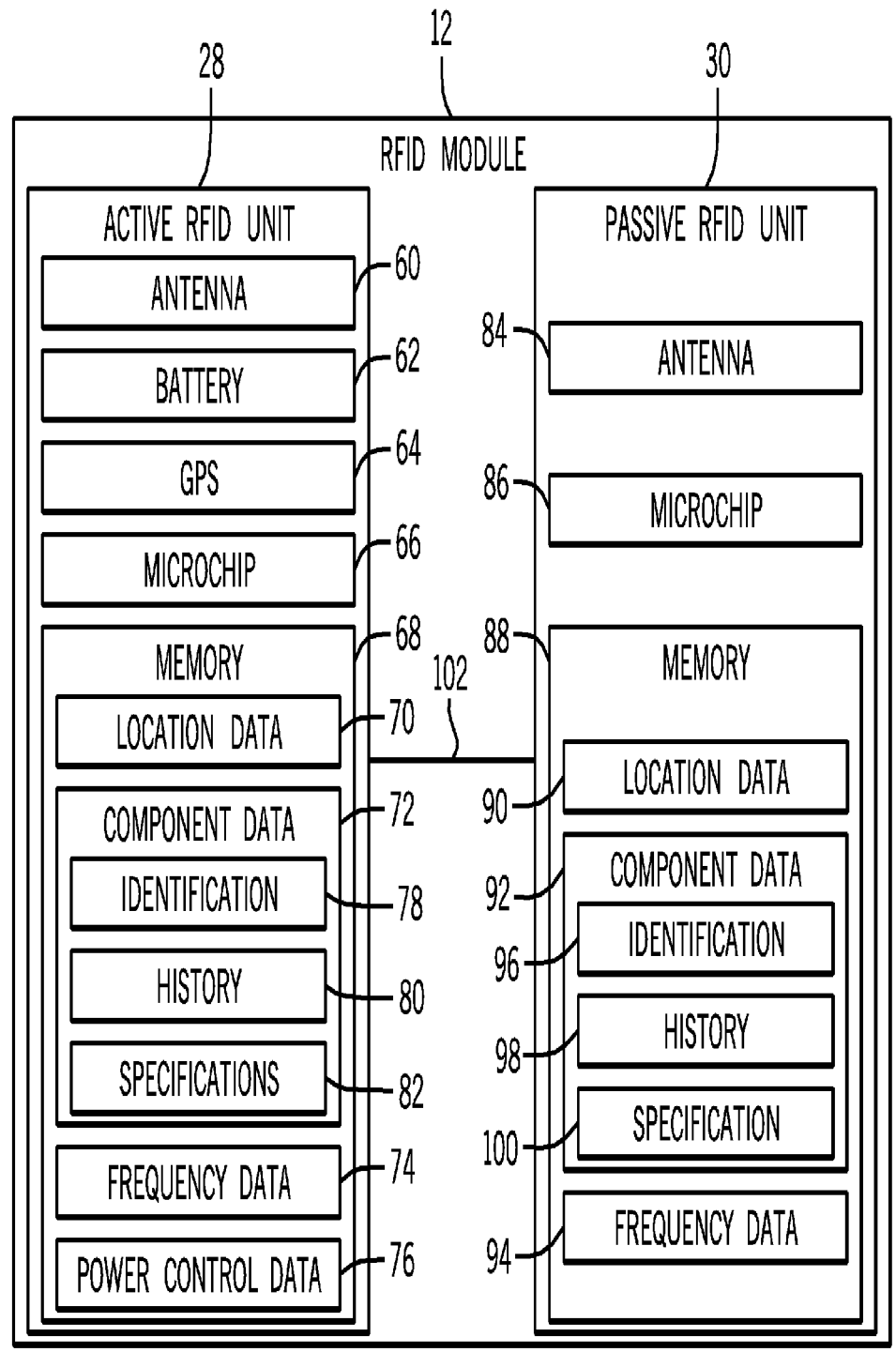
FIG. 2 is a block diagram of an embodiment of a radio frequency identification (RFID) module.

FIG. 2 is a block diagram of an embodiment of a radio frequency identification (RFID) module 12. The RFID module 12 includes an active RFID unit 28 and a passive RFID unit 30. The active RFID unit 28 may include an antenna 60, a battery 62, a global positioning system (GPS) 64, a microchip 66, and a memory 68. During use, the antenna 60 may receive and transmit signals. For example, the antenna 60 may permit communication with the asset management tool 14, other RFID modules 12, and GPS satellites. The battery 62 enables the active RFID unit 28 to transmit communications over distances that a passive RFID unit 30 cannot. This allows the asset management tool 14 and in particular the data acquisition unit 32 to communicate with active RFID units 28 at a distance (e.g., 1 to 300 meters, 1-200 meters, 1-100 meters). In some embodiments, the active RFID unit 28 may include GPS capabilities 64. The GPS 64 enables the active RFID unit 28 to determine its location, which may then be transmitted to the asset management tool 14 or to other RFID modules 12 that then use the information to determine their respective positions.

The microchip 66 processes incoming and outgoing communications and may communicate with the memory 68. The microchip 68 may be an application specific microchip specifically designed for RFID applications or a general-purpose microchip. In some embodiments, the microchip 66 may include a memory within the chip 66, rather than communicate with an external memory 68.

The memory 68 may store information for transmission to the asset management tool 14 or possibly other RFID modules 12. For example, the memory 68 may include location data 70, component data 72, frequency data 74, and power control data 76. In particular, the location data 70 may be preprogrammed allowing the unit 28 to automatically transmit its location to the asset management tool 14, thus eliminating repeated determination of its position. The component data 72 may include identification data 78, history 80, and specifications 82. As seen above, the asset management tool 14 may store the same information in database 38. Accordingly, the information may be safeguarded through storage in both the database 38 of the asset management tool 14 and in the memory 68 of the active RFID unit 28. The memory 68 may also include frequency data 74 (i.e., the frequencies that permit communication with and transmission from the active RFID unit 38). For example, the frequency data 74 may include a first frequency for communication with the tool 14, a second frequency to communicate with other RFID modules 12, and so forth. Finally, the memory 68 may include power control data 76. The power control data 76 may be used by the microchip 66 to prevent overconsumption of the battery 62. For example, the power control data 76 may include power saving information to reduce power consumption by shutting down unnecessary functions while not in use.

Similar to the active RFID unit 28, the passive RFID unit 30 includes an antenna 84, microchip 86, and memory 88. The antenna 84 permits reception and transmission of communications. The microchip 86 processes the incoming and outgoing communications. The memory 88 may include location data 90, component data 92, and frequency data 94. Component data 92 may include identification data 96, history data 98, and specification data 100. This information is similar to that discussed with respect to the active RFID unit memory 68 and may provide a safeguard for the storage of information. In some embodiments, the passive RFID unit 30 and the active RFID unit 28 may be connected with a communication line 102. In certain embodiments, the active and passive RFID units 28 and 30 may share one or more features, such as the microchip and/or memory.

Figure 3:
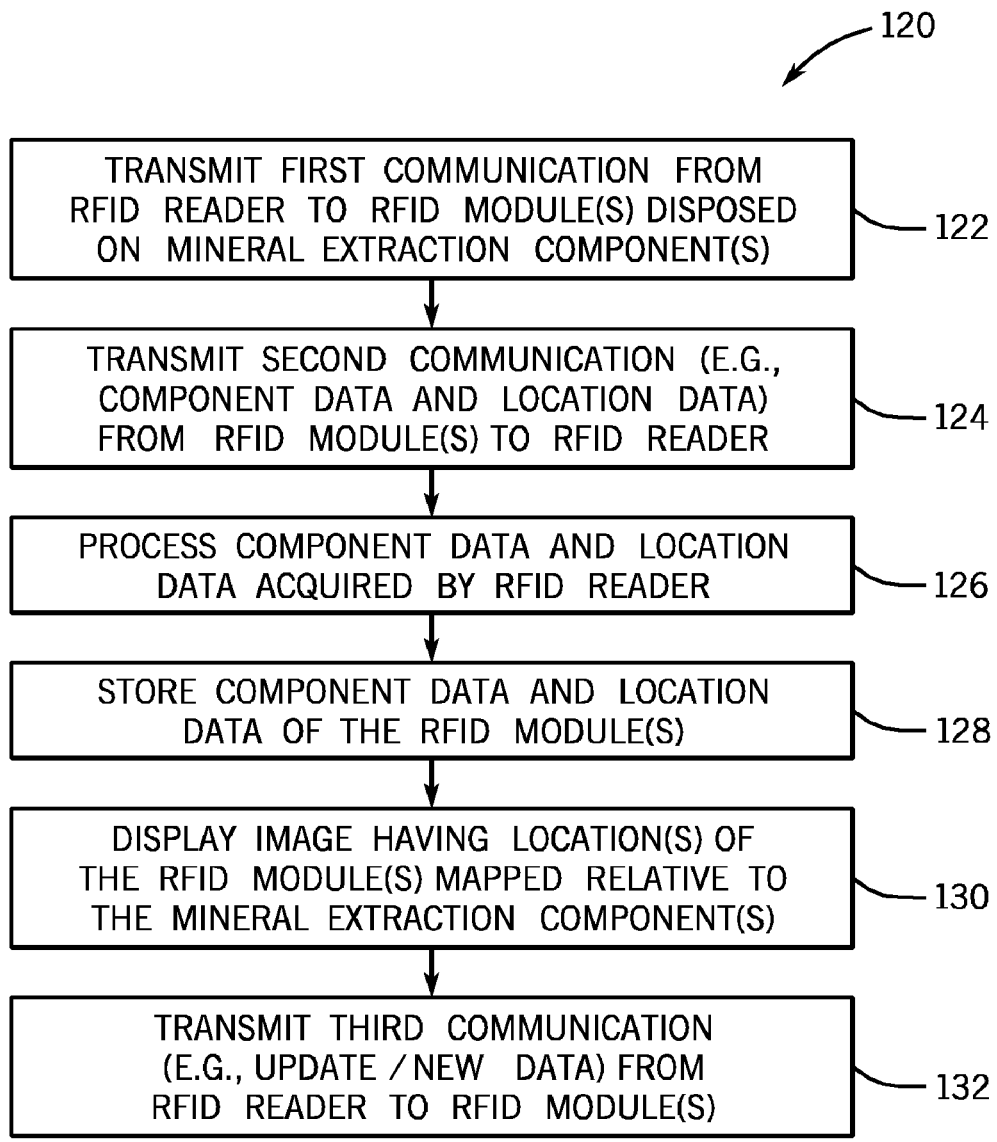
FIG. 3 is a flow chart of an embodiment of a process for managing assets.

FIG. 3 is a flow chart of an embodiment of a process 120 for managing assets of a mineral extraction system using the systems of FIGS. 1 and 2. The process 120 begins by transmitting a first communication from the RFID reader 31 to RFID module(s) 12 disposed on mineral extraction component(s). This first communication may wakeup RFID modules 12 or may be a request for information stored by the RFID module 12. The process 120 continues with a transmission of a second communication (e.g., component data and location data) from RFID module(s) 12 to the RFID reader 31. The RFID reader 31 receives the second communication and passes this information onto the data processing system 34 and data mapping system 36. These systems 34 and 36 then perform the third step 126 of processing the component data and location data acquired by the RFID reader 31. After processing the data, the process 120 transitions into the fourth step 128 of storing component data and location data of the RFID module(s) 12. For example, the data may be stored in the database 38. In the fifth step 130, a display 40 displays an image having location(s) of the RFID module(s) 12 mapped relative to the mineral extraction component(s). By mapping the RFID module(s) 12 relative to the mineral extraction component (s), an operator is able to determine the real world position of the mineral extraction component(s) by looking at an image. Accordingly, an operator may rapidly locate which mineral extraction component needs maintenance, replacement, visual inspection, or another service. After displaying the image, the process 120 moves to the sixth step 132 wherein the RFID reader 31 transmits a third communication (e.g., update/new data) to the RFID module(s) 12. In other words the RFID reader 31 may update the memories 68 and 88 of the RFID module 12 with additional information (i.e., service date, components changed out, etc.) or the third communication may perform another kind function (i.e., turn off RFID modules 12, change frequency, among other functions).

FIG. 4 is a flow chart of an embodiment of a process 150 for communicating with active RFID module(s) 12 using the systems of FIGS. 1 and 2. The process 150 begins with step one 152 by transmitting a first communication from the RFID reader 31 to active RFID unit(s) 28 disposed on mineral extraction component(s). In the second step 154, the active RFID unit(s) 28 wake in response to the first communication from the RFID reader 31. In order words, the active units 28 turn-on enabling the transmission and reception of information. In the third step 156, the active RFID unit(s) 28 transmit a second communication (e.g., component data and location data) from active RFID unit(s) 28 to the RFID reader 31. After receiving the second communication 156, the RFID reader 31 performs step four 158 wherein it transmits a third communication (e.g., update/new data) to the active RFID unit(s) 28. As explained previously, the updates and new data may include information such as service dates, components changed, components serviced, among others. The final step 160 in process 150 involves transmitting a fourth communication from the RFID reader 31 to active RFID unit(s) 28 to shut down active RFID unit(s) 28.

FIG. 5 is a flow chart of an embodiment of a process 170 for communicating with active RFID units 28 at different frequencies using the systems of FIGS. 1 and 2. In the first step 172, the process 170 begins by waking active RFID units 28 with a communication at a first frequency. In step two 174, the active RFID units 28 communicate with each other at a second frequency. For example, the active RFID units 28 may communicate with one another in order to determine their locations or to exchange some other kind of information. The third step 176 involves the RFID reader 31 communicating with the active RFID units 28 at a third frequency. In the final step 178, the active RFID units 28 are shutdown at a fourth frequency. For example, the RFID reader may transmit a communication at a fourth frequency that signals the units 28 to turn-off.

FIG. 6 is a flowchart of an embodiment of a process 200 for communicating with each RFID module 12 individually using the systems of FIGS. 1 and 2. The process 200 begins with step one 202 by waking an active RFID unit (N) with communication at frequency (I). As illustrated in block 204, all values are initially set to one. In other words, the process 200 begins by waking a first unit N at a first frequency I. In the second step 206, the RFID reader 31 communicates with the active RFID unit N at a frequency J. While communicating on frequency J, the reader 31 and active RFID unit N may pass information (e.g., location data, identification data, among others). In the third step 208, the active RFID unit N is shutdown with a communication at frequency K. After shutting down active RFID unit N, the process 200 enters a decision point 210. The decision point 210 enables the system to determine whether there are additional RFID units to communicate with. If there are no additional RFID units to be communicated with, the process ends at block 212. If there are additional units, then the process 200 changes the frequencies and the active RFID unit, as illustrated in block 214. Once the values for I, J, K, and N change, then the process 200 repeats steps 202, 206, 208, and 210 until there are no more units to communicate with. Thus, in the process 200, each RFID unit has one or more unique communication frequencies, which are different than the other RFID units. In this manner, the different frequencies may enable individual communications with specific RFID units without waking or interfering with all other RFID units.

FIG. 7 is a flow chart of an embodiment of a process 230 for mapping the location of an RFID module 12 onto an image using the systems of FIGS. 1 and 2. The process 230 begins by acquiring an image (e.g., still image or video image of a mineral extraction system) as indicated by block 232. After acquiring the image 232, the process 230 acquires data (e.g., unique identification and/or location data) from a plurality of RFID modules 12 disposed on components of the mineral extraction system as indicated by block 234. With the image and data, the process 230 proceeds to step three 236, which maps the location of each RFID module 12 on the image of the mineral extraction system. In step four 238, the process 230 stores the map data correlating map locations of RFID modules 12 with the image. In some embodiments, the mapped location of the RFID module on the image may not correctly correspond with its actual position on the mineral extraction system. In these situations, the process 230 may include an additional step five 240 wherein the operator manually updates each RFID module with the correct map location. However, in certain embodiments, the correct map location may be automatically acquired from memory and/or a GPS of each RFID module.

FIG. 8 is a block diagram of an embodiment of a system 258 with blind RFID modules (nodes) 260 and reference RFID modules (nodes) 262 communicating with each other. As illustrated, the modules 260 and 262 are able to transmit and receive signals 264. The signals 264 enable the blind modules 260 to determine their location by sending to and receiving signals from the reference modules 262. In other words, the blind modules 260 do not know their positions, but the reference modules 262 know their positions (e.g., preprogrammed with location information or may include GPS functionality). Accordingly, when the blind modules 260 send to and receive signals from the reference modules 262, the blind nodes 260 may determine their position (e.g., by triangulation). In some embodiments, the RFID reader 268 may include GPS functionality and accordingly function as a reference module that assists the blind modules 260 in determining their location.

FIG. 9 is a block diagram of a system 278 with RFID modules 280, each of which knows its position (i.e., reference modules). Accordingly, the modules 280 may all communicate their position to the reader 282 without any need for triangulation with other modules 280. The modules 280 may know their position through preprogramming or GPS functionality.

Figure 10:
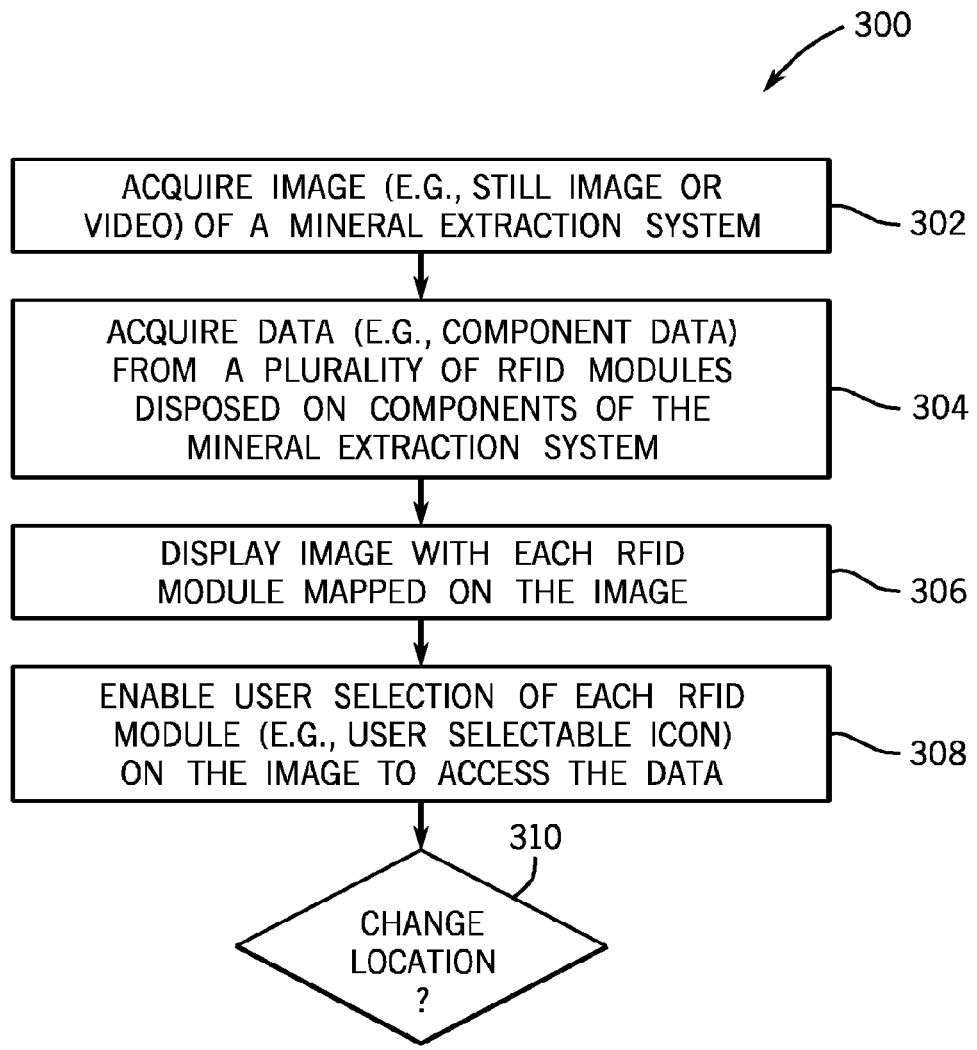
FIG. 10 is a flow chart of an embodiment of a process using augmented reality to manage assets.

FIG. 10 is a flow chart of an embodiment of a process 300 using augmented reality to manage assets, such as mineral extraction equipment. Step one 302 of process 300 involves acquiring an image (e.g., still image or video image) of a mineral extraction system. In step two 304, the process 300 acquires data (e.g., component data) from a plurality of RFID modules 12 disposed on components of the mineral extraction system. The image and acquired data is then used in step three 306 to display an image with each RFID module 12 mapped on the image. In other words, each RFID module 12 mapped on the image is associated with a specific piece of equipment in the mineral extraction system. Step four 308 then enables user selection of each RFID module (e.g., user selectable icon) on the image to access data about the specific piece of equipment in the mineral extraction system associated with the RFID module 12. For example, a different portion of the image may change colors or become active as an operator moves a cursor across the image on a display, thereby enabling the operator to select that portion of the image associated with a particular RFID module. In an augmented reality process 300, the operator may change their location at decision point 310 with the process 300 automatically repeating steps 302, 304, and 306. In other words, process 300 allows an operator to continuously change their position during which the image automatically adjusts and the RFID modules are remapped on the image. This enables an operator to recognize the position of equipment in the mineral extraction system regardless of their position relative to the system. Furthermore, the process 300 enables an operator to select the icon (or other operator selectable indicia) associated with the piece of equipment while viewing the image, to either update or access data about that specific piece of equipment.

Figure 11:
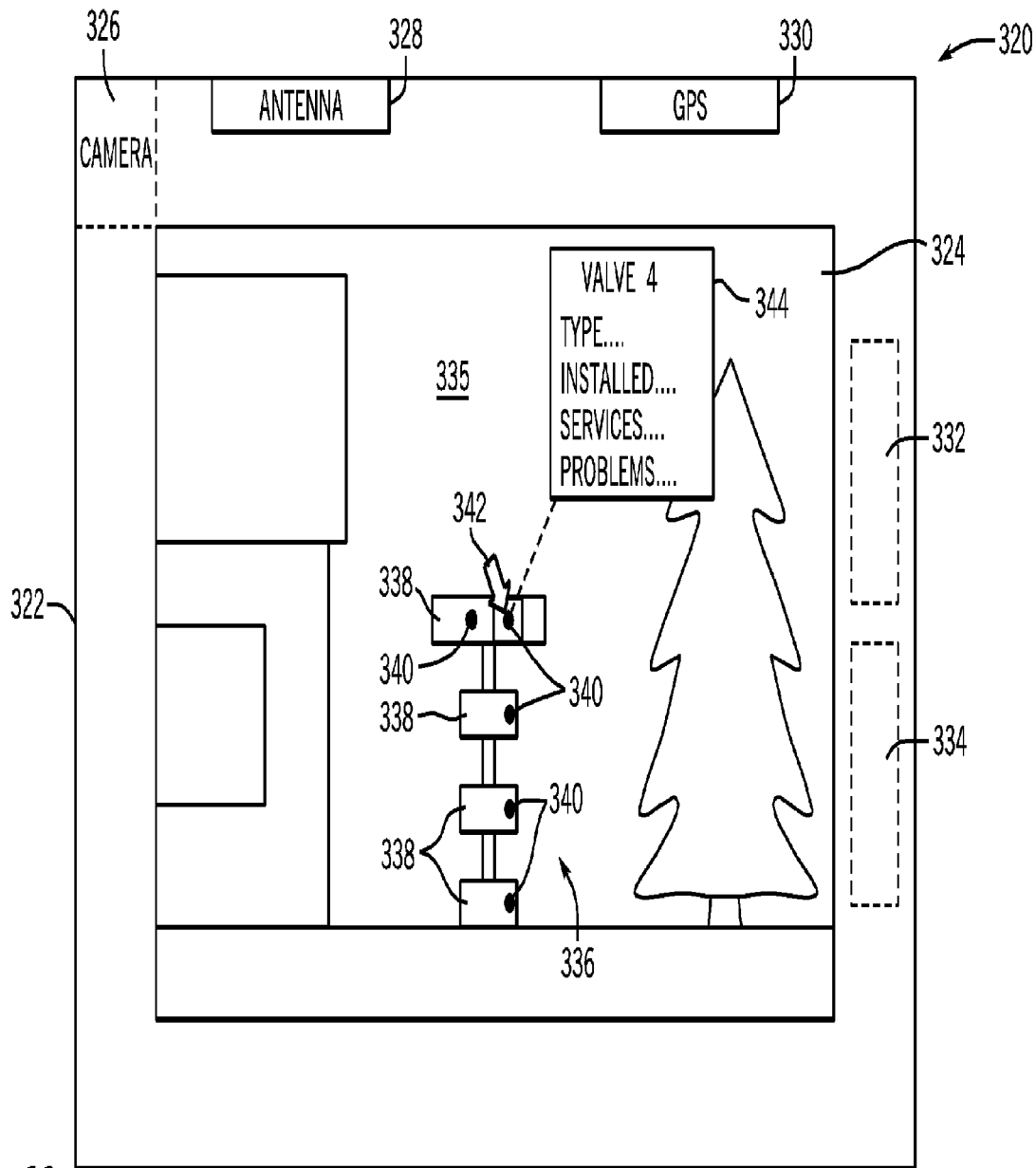
FIG. 11 is a block diagram of an embodiment illustrating an asset management tool utilizing augmented reality.

FIG. 11 is a schematic of an embodiment of an asset management tool 320 utilizing augmented reality. In other words, the tool 320 may be described as an augmented reality asset management tool or system. The tool 320 includes a frame 322, display 324, camera 326, antenna 328, GPS 330, memory 332, and processor 334. As illustrated, the frame 322 surrounds the display 324. In certain embodiments, the display 324 may be a touch screen, thus enabling a user to interact with the display 324. The camera 326 may be a still camera and/or a video camera enabling the operator to captures images 335 of mineral extraction systems for display on the display 324. As seen in FIG. 11, the display currently shows an image 335 (e.g., a real-time image) of a mineral extraction system 336 (e.g., a Christmas tree). The mineral extraction system 336 includes valves 338 and RFID modules represented by icons 340.

As explained above, the RFID modules 340 may transmit data including identification and location data. The antenna 328 receives this data and passes it on to the processor 334. The processor 334 may then take this information and map it onto the images 335 taken by the camera 326. In this manner, the tool 320 correlates the images 335 with the data received from the RFID modules 340, thus enabling an operator to identify specific components (e.g., valves 338) of the mineral extraction system 336 in the image 335. During use, the operator may operate a user input device to move a cursor 342 over the icons 340 (e.g., overlaid information). The processor 334 may then automatically cause a popup window 344 (e.g., overlaid information) to appear when the cursor passes over an icon 340. The popup window 344 may show information (e.g., type of valve, installation date, service dates and types, problems experienced, etc.) retrieved from the memory 332 or from the RFID module associated with that piece of equipment. In other embodiments, the processor 334 may wait for the user to select the specific icon before displaying the popup window.

In the illustrated embodiment, the tool 320 uses augmented reality, and thus may enable the operator to view the image 335 and overlaid information (e.g., icons 340 and windows 344) in real-time. Accordingly, as the operator moves the tool 320 to change the point of view of the camera 326, the image 335 changes in real-time to depict the current point of view of the operator, and simultaneously updates the mapping of the RFID modules 340 and associated overlaid information (e.g., icons 340 and windows 344) in real-time. In this manner, the operator can experience the real world having the mineral extraction system 336 along with the overlaid information in real-time, thereby enabling the operator to quickly obtain information about the system 336. As discussed above, the asset management tool 320 may be separated into two or more separate tools. For example, in the case of a subsea well, the data acquisition system 332 may be located on an underwater remotely operated vehicle (ROV) that communicates information to a data processing system 334 located at the sea surface either through a hard wire communication connection or other type of wired or wireless telemetry system. The ROV may be equipped with appropriate imaging equipment to provide the images for the augmented reality capabilities.

Figure 12:
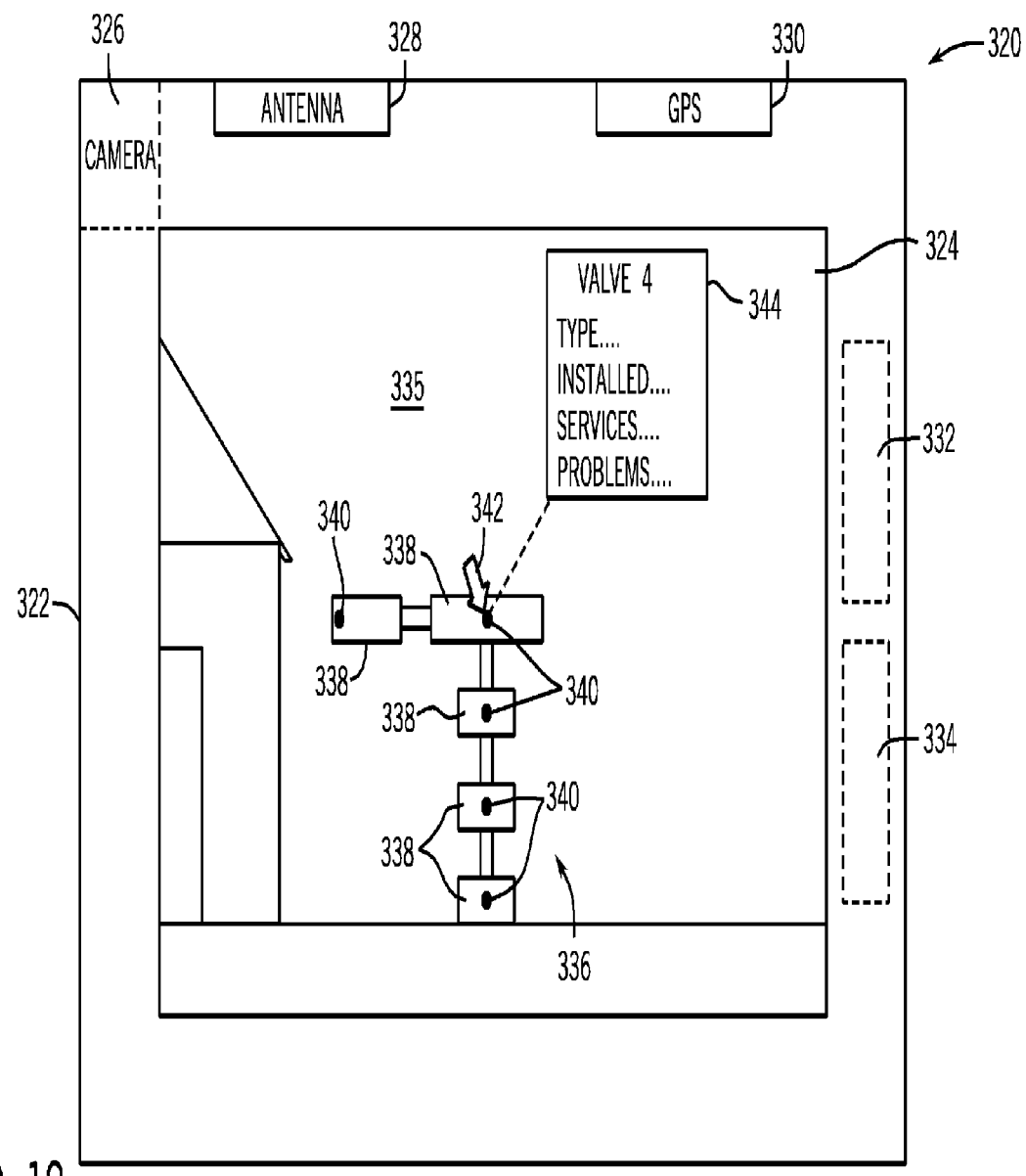
FIG. 12 is a block diagram of an embodiment illustrating an asset management tool utilizing augmented reality.

FIG. 12 is a schematic of an embodiment illustrating the asset management tool 320 using augmented reality. In particular, FIG. 12 is the same as FIG. 11 except that the image 335 has changed its point of view slightly (i.e., rotated 90 degrees). As illustrated, the tool 320 continues to show the mineral extraction system 336 with the RFID modules 340 and valves 338. Indeed, as the operator moves around the mineral extraction system 336, the GPS 330 tracks the position of tool 320 while the camera 326 sends updated images 335 to the processor 334. Simultaneously, the antenna 328 receives location and identification data from the RFID modules 340. The processor 334 processes and combines the changing image data with the identification and location data and updates the image 335 on the display 324. In this manner, the tool 320 provides the operator an understanding of where equipment is located and the necessary information to manage the equipment.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for monitoring a component of a mineral extraction system, the method comprising:
coupling a radio frequency identification ("RFID") module to the component, the RFID module comprising an active RFID unit and a passive RFID unit;
storing component data relating to the component in the RFID module;
storing location data relating to a location of the component relative to the mineral extraction system in the RFID module;
transmitting a communication from the RFID module to a RFID reader, the communication comprising the component data and the location data;
mapping the location of the component on a real-time image of the mineral extraction system based upon the location data stored in the RFID module;
powering up the active RFID unit in response to the first communication from the RFID reader to the RFID module;

powering down the active RFID unit in response to a second communication from the RFID reader to the RFID module; and wherein the first communication comprises a first communication frequency and the second communication comprises a second communication frequency different from the first communication frequency.

2. The method of claim 1, wherein the passive RFID unit is directly coupled to the active RFID unit.

3. The method of claim 1, wherein the RFID module comprises an active RFID unit having a battery and a power control feature, the method further comprising conserving energy in the battery via the power control feature.

4. The method of claim 1, further comprising storing the component data and the location data on an asset management system.

5. The method of claim 1, further comprising generating the location data relating to the location of the component with a global positioning system ("GPS") unit in the RFID module.

6. A method for monitoring components of a mineral extraction system, the method comprising:

providing a plurality of radio frequency identification ("RFID") modules on the components, the RFID modules configured to communicate with each other and/or to a data acquisition system;

acquiring component data and location data stored in the plurality of RFID modules via the data acquisition system comprising at least one RFID reader configured to simultaneously communicate with the plurality of RFID modules to acquire the component data and the location data;

mapping the locations of the plurality of RFID modules on a real-time image of the mineral extraction system based upon the location data stored in the plurality of RFID modules via a data mapping system comprising an augmented reality system configured to map locations of the plurality of RFID modules on the image of the mineral extraction system in real-time; and wherein the plurality of RFID modules are configured to communicate with each other on a different frequency than a frequency used for communication with the data acquisition system.

7. The system of claim 6, wherein the data mapping system and/or at least one of the RFID modules comprises a global positioning system ("GPS") unit.

8. A method for monitoring a component of a mineral extraction system, the method comprising:

coupling a radio frequency identification ("RFID") module comprising an active RFID unit to the component;

transmitting a first communication from a RFID reader to the active RFID unit while the active RFID unit is in sleep mode;

waking the active RFID unit in response to the first communication;

transmitting a second communication from the active RFID unit to the RFID reader, the second communication comprising component data relating to the component and location data relating to a location of the component relative to the mineral extraction system;

transmitting a third communication from the RFID reader to the active RFID unit to direct the active RFID unit to re-enter sleep mode; and wherein the first communication, the second communication, and the third communication occur on different frequencies.

9. The method of claim 8, further comprising mapping the location of the component on a real-time image of the mineral extraction system based upon the location data via an asset management system.

* * * * *